US006327935B1

(12) United States Patent
Joslin et al.

(10) Patent No.: US 6,327,935 B1
(45) Date of Patent: *Dec. 11, 2001

(54) DUAL CLUTCH REAR AXLE AND METHOD OF OPERATION

(75) Inventors: Mark T. Joslin, Tokyo (JP); Dan J. Showalter, Plymouth; Dean P. Knowles, Clinton Township, both of MI (US)

(73) Assignee: BorgWarner Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/255,234

(22) Filed: Feb. 22, 1999

Related U.S. Application Data

(62) Division of application No. 08/847,140, filed on Apr. 30, 1997, now Pat. No. 5,884,738.

(51) Int. Cl.[7] .................................................. F16H 48/12
(52) U.S. Cl. ................................................ 74/650; 192/35
(58) Field of Search ........................... 74/650, 230, 231; 192/35

(56) References Cited

U.S. PATENT DOCUMENTS

| 2,555,215 | * | 5/1951 | Warner ................................. 192/35 |
| 3,361,238 | * | 1/1968 | Yokel .................................. 192/84 |
| 3,429,409 | * | 2/1969 | Leblanc ............................... 192/84 |
| 4,681,180 | * | 7/1987 | Oyama et al. ....................... 180/76 |
| 4,718,303 | * | 5/1951 | Fogelberg ........................... 74/710.5 |
| 4,829,849 | * | 5/1989 | Masuda et al. ..................... 74/650 |
| 4,899,861 | * | 2/1990 | Cummings, III .................... 192/85 |
| 4,991,679 | * | 2/1991 | Fujii et al. .......................... 180/233 |
| 5,105,901 | * | 4/1992 | Watanabe et al. .................. 180/249 |
| 5,119,900 | * | 6/1992 | Watanabe et al. .................. 180/245 |
| 5,189,930 | * | 3/1993 | Kameda ............................... 74/650 |
| 5,279,384 | * | 1/1994 | Shibahata et al. ................. 180/248 |
| 5,341,893 | * | 8/1994 | Fukui et al. ........................ 180/245 |
| 5,353,889 | * | 10/1994 | Hamada ............................. 180/242 |
| 5,366,041 | * | 11/1994 | Shiraishi et al. ................... 180/248 |
| 5,383,378 | * | 1/1995 | Paul et al. ............................ 74/650 |
| 5,398,792 | * | 3/1995 | Tearoaka ............................ 192/48.2 |
| 5,407,024 | * | 4/1995 | Watson et al. ..................... 180/248 |
| 5,485,894 | * | 1/1996 | Watson et al. ..................... 180/248 |
| 5,492,194 | * | 2/1996 | McGinn et al. .................... 180/233 |
| 5,540,119 | * | 7/1996 | Hudson ................................ 74/650 |
| 5,690,002 | * | 11/1997 | Showalter ........................... 74/650 |
| 5,699,888 | * | 12/1997 | Showalter ........................... 192/35 |

FOREIGN PATENT DOCUMENTS

766733 * 1/1957 (GB) .
906506 * 9/1962 (GB) .

* cited by examiner

Primary Examiner—Sherry Estremsky
(74) Attorney, Agent, or Firm—Brinks, Hofer, Gilson & Lione; Greg Dziegielewski

(57) ABSTRACT

A clutch assembly for disposition in a motor vehicle drive line includes an internal reaction force circuit. The clutch assembly includes a multiple disc friction clutch disposed adjacent an operator assembly which selectively applies force to the friction clutch to selectively transfer torque therethrough. The clutch components are disposed between fixed stops on an elongate member which functions as a reaction force member to self-contain the reaction force from the clutch operator. The clutch finds application in motor vehicle drive line components such as a rear (secondary) axle in which it is disposed in pairs to independently control torque supplied to each axle and in applications where it is advantageous to contain or ground the reaction force generated by and associated with the clutch operator compactly within the clutch structure rather than its housing.

22 Claims, 4 Drawing Sheets

DUAL CLUTCH REAR AXLE AND METHOD OF OPERATION

CROSS REFERENCE TO APPLICATION

This application is a divisional application of Ser. No. 08/847,140, filed Apr. 30, 1997 now U.S. Pat. No. 5,884,738, granted Mar. 23, 1999.

BACKGROUND OF THE INVENTION

The invention relates generally to multiple friction plate clutches for motor vehicles and more specifically to clutches for motor vehicle drive line components having an internal reaction force circuit.

Vehicle drive line and control systems having both electric and hydraulic modulating clutches have found broad application in adaptive vehicle drive systems. Such systems generally monitor the speeds of the front and rear drive shaft or compute such speeds by taking averages of individual readings of the two front and two rear wheels and, upon determining a speed difference between the drive shaft speeds or average speeds of the wheels, energize the modulating clutch according to a predetermined program to drive the speed difference and thus wheel slip toward zero. Such systems may also monitor and adjust modulating clutch activity in response to throttle position, steering angle and other variables.

Typically, such modulating clutches are physically disposed in a transfer case, adjacent and driven by the output of the vehicle transmission, and operably disposed between the primary and secondary drive lines. Such systems are disposed in co-owned U.S. Pat. No. 5,407,024 granted Apr. 18, 1995 and U.S. Pat. No. 5,485,894 granted Jan. 23, 1996.

An alternate approach to vehicle skid control comprehends association of an individually operable clutch with each axle of a secondary, that is, part-time drive line. Selective, modulating activation of one or both of the clutches directs drive torque to one or both secondary drive wheels to adjust or correct vehicle yaw. An early system utilizing hydraulic clutches is disclosed in U.S. Pat. No. 4,681,180. Here, a control unit having steering angle, vehicle speed and engine torque inputs and adjust torque distribution between only the two rear wheels.

U.S. Pat. Nos. 5,195,901 and 5,119,900 both teach a vehicle having two independently operable rear axle clutches in a drive line which provides primary drive torque to the front wheels and selectively to the rear wheels.

In U.S. Pat. No. 5,353,889 a rear axle includes a pair of hydraulically operated independent clutches controlled by a associated hydraulic pressure clutches and pumps.

In U.S. Pat. No. 5,383,378, a twin clutch axle disposed at the front of a vehicle provide drive torque to the front (secondary) drive wheel in response to steering angle. U.S. Pat. No. 5,540,119 teaches a differential drive assembly for transferring rotational power without the use of conventional differential gearing. The device utilizes pairs of clutches and cam mechanisms which actuate said clutches in response a predetermined relative rotation.

While many problems have been addressed and new operational schemes achieved by the devices found in the prior, it is apparent that certain problems have not been addressed. For example, it should be appreciated that, according to Newton's third law of motion, the direct or action force generated by a clutch operator to compress an adjacent clutch pack creates an equal and opposite reaction force which is transmitted through whatever structural components of the clutch assembly constitute the reaction force path or circuit.

Typically, such reaction force path will be through or contained in an outer housing in devices where the clutch pack is disposed adjacent the clutch operator and both are contained within the housing. Such a configuration can apply significant reaction force, not only to the housing, but also to whatever fasteners are utilized to secure the housing components together. Such a configuration can be disadvantageous, causing either fastener or housing failure or necessitate heavy and therefore costly housing and fastener configurations. Accurately controlled modulation of the clutches may also be compromised due to flexure or distortion of the housing or other components in the reaction force path. Accordingly, the operation of devices containing such clutches may be compromised. The present invention addresses such matters.

SUMMARY OF THE INVENTION

A clutch assembly for disposition in a motor vehicle drive line includes an internal reaction force circuit. The clutch assembly includes a multiple path or disc friction clutch disposed adjacent an operator assembly which selectively applies force to the friction clutch to selectively transfer torque therethrough. The clutch components are disposed between fixed stops on an elongate member which functions as a reaction force member to self-contain the reaction force from the clutch operator. Preferably, the clutch operator is a ball ramp assembly which is actuated by an electromagnetic coil. Direct acting hydraulic or air driven piston and cylinder operators or pilot and main clutches which are electrically, pneumatically or hydraulically operated are also useful with and within the scope of the present invention.

The clutch finds application in motor vehicle drive line components such as a rear (secondary) axle in which it is disposed in pairs to independently control torque supplied to each axle and in applications where it is advantageous to contain or ground the reaction force generated by and associated with the clutch operator compactly within the clutch structure rather than its housing.

It is thus an object of the present invention to provide a multiple friction plate clutch having an internal reaction force circuit.

It is a still further object of the present invention to provide a multiple friction plate clutch and operator which are juxtaposed upon an elongate member which functions as the reaction force return circuit.

It is a still further object of the present invention to provide a multiple plate friction clutch assembly having an internal reaction force circuit for use in motor vehicle drive lines.

It is a still further object of the present invention to provide a multiple plate friction clutch assembly having an internal reaction force circuit for use in pairs in a rear (secondary) axle independently controlling torque delivery to associated wheels.

It is a still further object of the present invention to provide a multiple friction plate clutch and operator assembly are juxtaposed and assembled upon a common member which functions as a reaction force containing member.

Further objects and advantages of the present invention will become apparent by reference to the following description of the preferred embodiment and appended drawings wherein like numbers refer to the same component, element or feature.

DESCRIPTION OF THE PREFERRED EMBODIMENT

Figure 1:
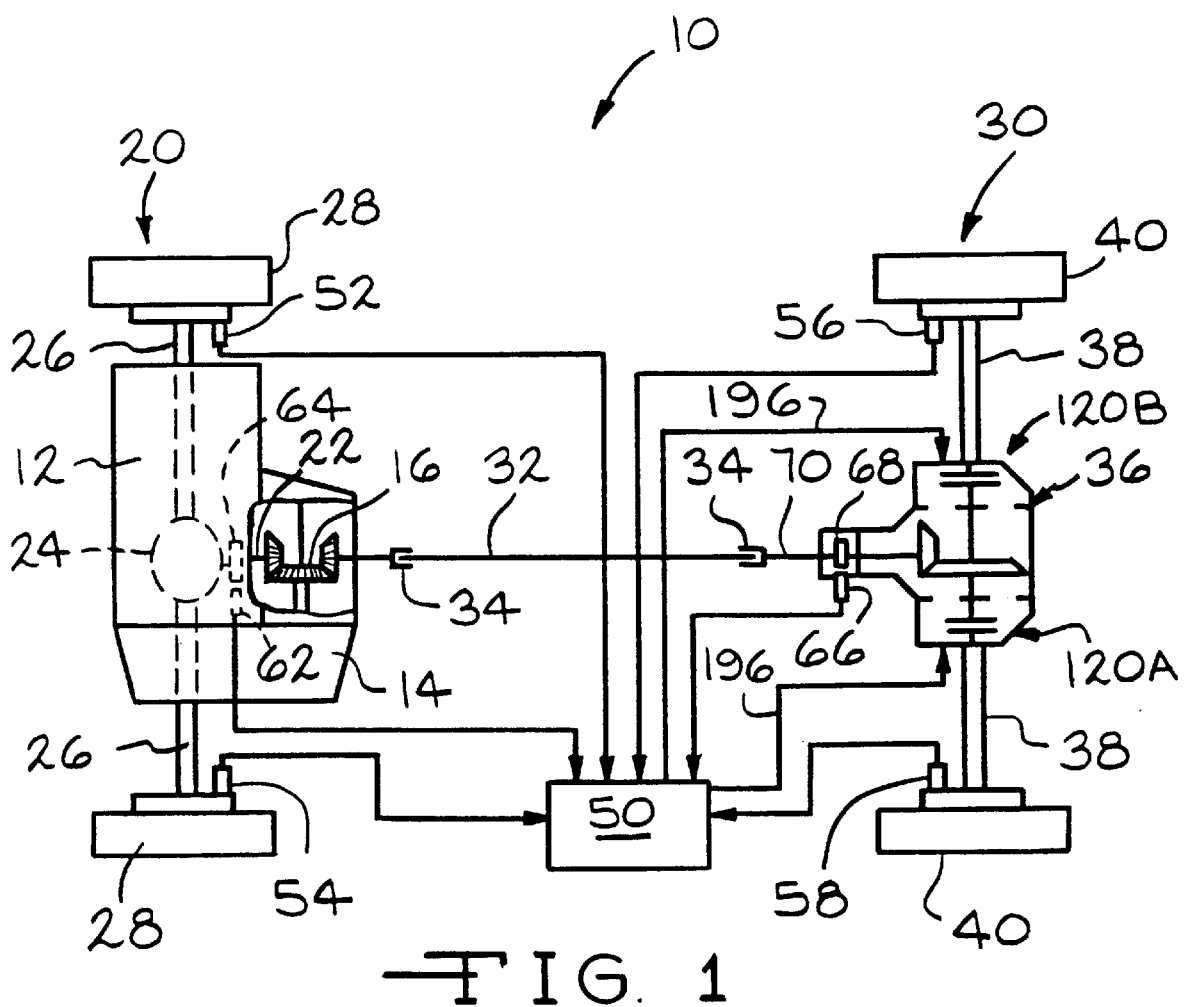
FIG. 1 is a diagrammatic view of a vehicle drive system for a four-wheel vehicle incorporating the twin clutch axle of the present invention.
Figure 2:
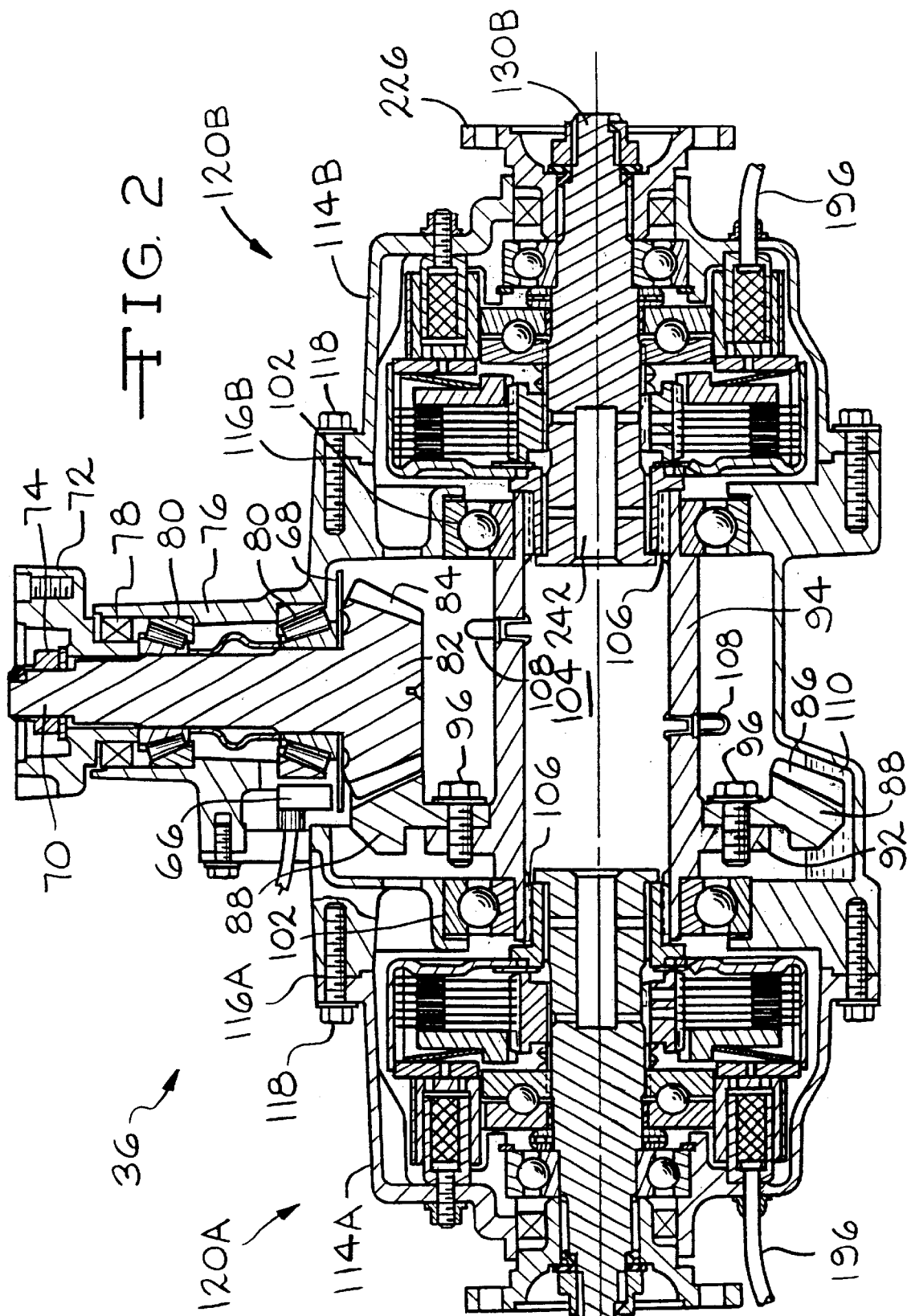
FIG. 2 is a full, sectional view of a twin clutch axle incorporating clutches having internal reaction force circuits according to the present invention.

Referring now to FIGS. 1 and 2, an adaptive four-wheel vehicle drive train incorporating the present invention is diagrammatically illustrated and designated by the reference number 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front drive line 20 comprising a front or primary propshaft 22, a front or primary differential 24, a pair of live front axles 26 and a respective pair of front or primary tire and wheel assemblies 28. It should be appreciated that the front or primary differential 24 is conventional.

The beveled or spiral beveled gear set 16 also provides motive power to a secondary or rear drive line 30 comprising a secondary propshaft 32 having appropriate universal joints 34, a rear or secondary differential assembly 36, a pair of live secondary or rear axles 38 and a respective pair of secondary or rear tire and wheel assemblies 40. As utilized herein with regard to the secondary differential assembly 36, the terms "differential" and "axle" are used inter-changeably to identify a device for receiving drive line torque, distributing it to two transversely disposed wheels and accommodating rotational speed differences resulting from, inter alia, vehicle cornering. As such, the terms are intended to include devices such as the present invention which provide these functions but which do not include a conventional epicyclic gear train.

The foregoing description relates to a vehicle wherein the primary drive line 20 is disposed at the front of the vehicle and, correspondingly, the secondary drive line 30 is disposed at the rear of the vehicle, such a vehicle commonly being referred to as a front wheel drive vehicle. The designations "primary" and "secondary" utilized herein refer to drive lines providing drive torque at all times and drive lines providing supplemental or intermittent torque, respectively. These designations (primary and secondary) are utilized herein rather than front and rear inasmuch as the invention herein disclosed and claimed may be readily utilized with vehicles wherein the primary drive line 20 is disposed at the rear of the vehicle and the secondary drive line 30 and components within the secondary differential assembly 36 are disposed at the front of the vehicle.

Thus, the illustration in FIG. 1, wherein the primary drive line 20 is disposed at the front of the vehicle should be understood to be illustrative rather than limiting and that the components and the general arrangement of components illustrated is equally suitable and usable with a primary rear wheel drive vehicle. In such a vehicle, the primary differential 24 would replace the secondary differential assembly 36 at the rear of the vehicle and the secondary differential assembly 36 would be moved to the front of the vehicle to replace the primary differential 24.

Associated with the vehicle drive train 10 is a microprocessor 50 which receives signals from a plurality of sensors and provides two control, i.e., actuation signals to the secondary differential assembly 36. Specifically, a first sensor such as a variable reluctance or Hall effect sensor 52 senses the rotational speed of the right primary (front) tire and wheel assembly 28 and provides an appropriate signal to the microprocessor 50. Similarly, a second variable reluctance or Hall effect sensor 54 senses the rotational speed of the left primary (front) tire and wheel assembly 28 and provides a signal to the microprocessor 50. A third variable reluctance or Hall effect sensor 56 senses the rotational speed of the right secondary (rear) tire and wheel assembly 40 and provides a signal to the microprocessor 50. Finally, a fourth variable reluctance or Hall effect sensor 58 associated with the left secondary (rear) tire and wheel assembly 40 senses its speed and provides a signal to the microprocessor 50. It should be understood that the speed sensors 52, 54, 56 and 58 may be independent, i.e., dedicated, sensors or may be those sensors mounted in the vehicle for anti-lock brake systems (ABS) or other speed sensing and control equipment. It is also to be understood that an appropriate and conventional counting or tone wheel is associated with each of the speed sensors 52, 54, 56 and 58 although they are not illustrated in FIG. 1.

In order to provide optimum skid or yaw control, the microprocessor 50 also requires information regarding the output speed of the transaxle 14. Accordingly, a variable reluctance or Hall effect sensor 62 which is associated with a tone wheel 64 on the front or primary prop shaft 22 may be utilized. In the alternative, a variable reluctance or Hall effect sensor 66 associated with the secondary differential assembly 36 and positioned adjacent a tone wheel 68 on an input shaft 70 of the secondary differential assembly 36 may also be utilized. The microprocessor 50 includes software which receives and conditions the signals from the sensors 52, 54, 56 and 58 as well as either the sensor 62 or the sensor 66, determines corrective action to improve the stability of the vehicle, maintain control of the vehicle and/or correct and compensate for a skid or other anomalous yaw condition of the vehicle and provides two independent output signals to the secondary differential assembly 36.

Referring now to FIG. 2, the input shaft 70 of the secondary differential assembly 36 may include a flange 72 or similar component which is secured to the input shaft 70 by a nut 74 or similar threaded fastener. The flange 72 forms a portion of a connection, such as a universal joint 34 (illustrated in FIG. 1), to the secondary propshaft 32. The input shaft 70 is received within a center housing 76 and is surrounded by a suitable oil seal 78 which provides a fluid impervious seal between the housing 76 and an associated portion of the flange 72 or the input shaft 70. The input shaft 70 is preferably rotatably supported by a pair of anti-friction bearings such as the tapered roller bearing assemblies 80. The input shaft 70 terminates in a hypoid or beveled gear 82 having gear teeth 84 which mate with complementarily configured gear teeth 86 on a ring gear 88 secured to a flange 92 on a centrally disposed tubular drive member 94 by suitable fasteners 96. The tubular drive member 94 is rotatably supported at each end by an anti-friction bearing such as the ball bearing assemblies 102. The tubular drive member 94 defines a hollow interior 104 and includes female splines or gear teeth 106 adjacent each end. A pair of scavengers or scoops 108 collect and deliver cooling and lubricating fluid 110 from the interior of the center housing 76 to the hollow interior 104 of the tubular drive member 94.

Figure 3:
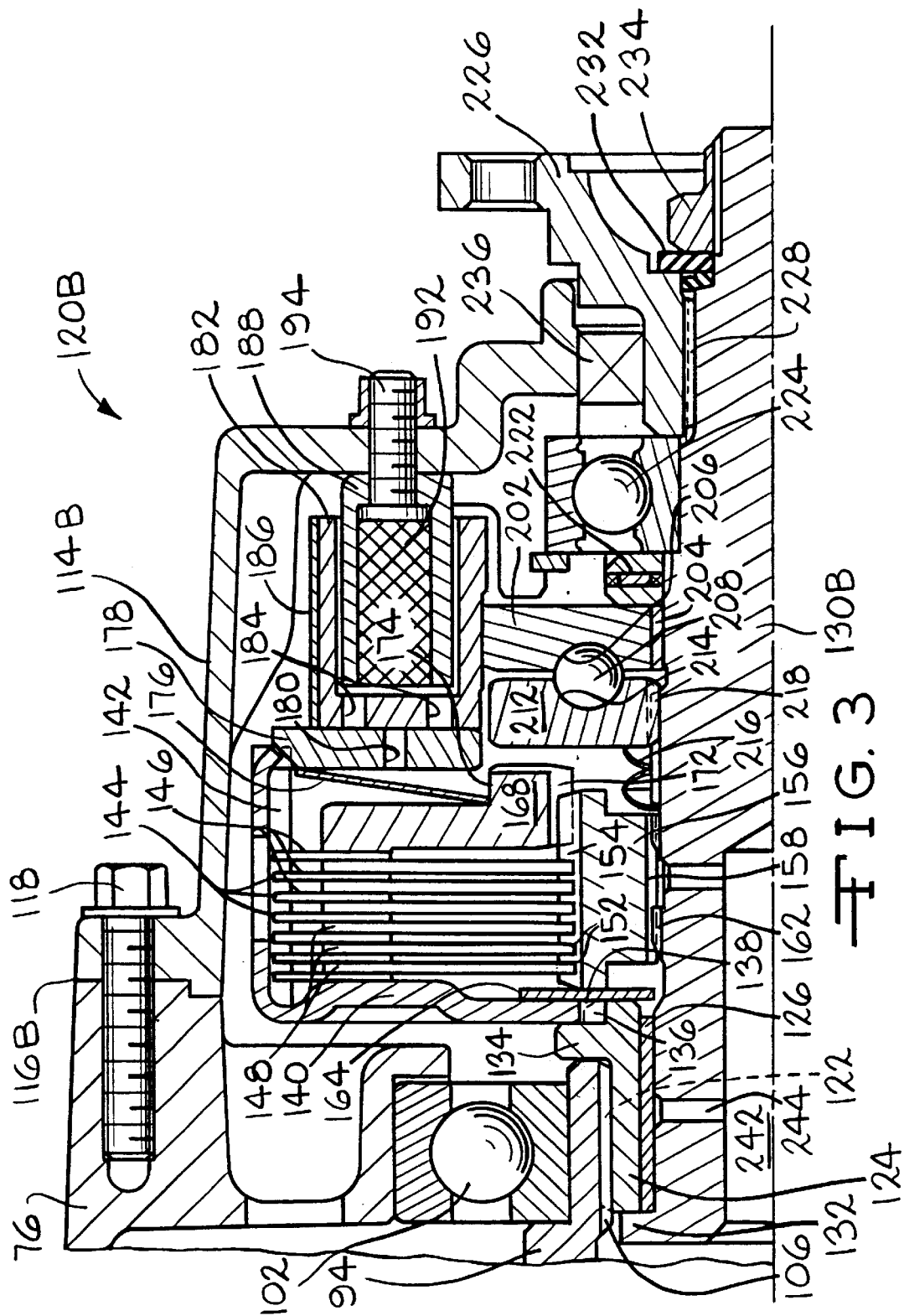
FIG. 3 is an enlarged, sectional view of a clutch having an internal reaction force circuit according to the present invention.
Figure 4:
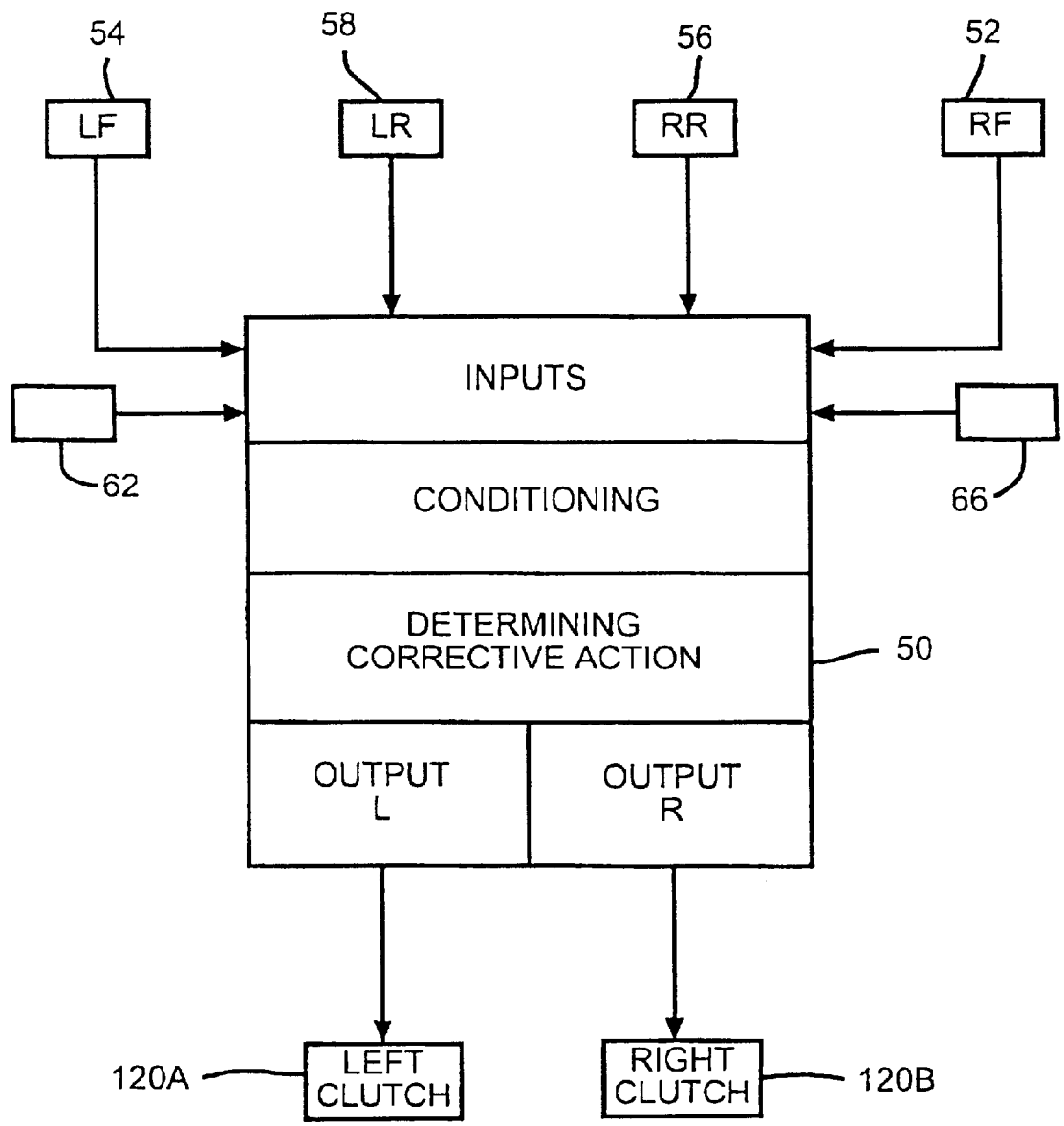
FIG. 4 is a diagram of the elements and operation of a twin clutch axle and microprocessor system according to the present invention.

Turning now to FIGS. 2 and 3, the secondary differential assembly 36 includes a pair of bell housings 114A and 114B which mate with the center housing 74 along parting lines 116A and 116B and are attached to the center housing 74 by threaded fasteners 118. The housings 114A and 114B are mirror-image, i.e., left and right, components which each receive and house a respective one of a pair of modulating clutch assemblies 120A and 120B. But for the opposed, mirror-image arrangement of the two modulating clutch assemblies 120A and 120B, the components of the two clutch assemblies 120A and 120B described below are identical and thus only the modulating clutch assembly 120B disposed on the right of FIG. 2 and in FIG. 3 will be fully described, it being understood that the left modulating clutch assembly 120A is in all significant respects identical to the right modulating clutch assembly 120B.

Each of the modulating clutch assemblies 120A and 120B is driven by the internal splines or gear teeth 106 of the tubular drive member 94 which engage complementarily configured male splines or gear teeth 122 on an annular collar 124. The annular collar 124 is freely rotatably disposed upon a sleeve bearing 126 which, in turn, is freely rotatably disposed upon an output shaft 130B. The output shaft 130B includes a flange on shoulder 132 against which the annular collar 124 abuts. The annular collar 124 includes a radial flange 134 which engages the end of the tubular drive member 94. The annular collar 124 also includes a plurality of male splines or gear teeth 136 disposed adjacent the radial flange 134. The male splines or gear teeth 136 receive and rotationally engage complementarily configured female splines or gear teeth 138 disposed on a clutch end bell 140.

The interior, circumferential surface of the clutch end bell 140 defines a plurality of axially extending female splines 142 which are engaged by and rotationally drive complimentarily configured male splines 144 disposed on a first plurality of clutch plates or discs 146. The first plurality of clutch plates or discs 146 includes suitable friction material and surfaces and are interleaved with a second plurality of smaller diameter clutch plates or discs 148 also including suitable friction material and surfaces and have female splines 152 which engage and rotationally drive complementarily configured male splines 154 disposed upon an annulus or collar 156. The collar 156, in turn, includes female splines or gear teeth 158 which mate with complementarily configured male splines or gear teeth 162 disposed on the output shaft 130B. A friction reducing flat washer 164 is disposed between internal surface of the clutch end bell 140 and the annulus or collar 156.

The disc pack clutch assembly 120B also includes a circular apply plate 168 which includes female splines or gear teeth 172 which mate with the male splines 154 on the collar 156. The apply plate 168 is preferably fabricated of a non-magnetic metal such as stainless steel so that it does not participate in nor interfere with the magnetic circuit (flux path) of the modulating clutch assembly 120B. The apply plate 168 thus rotates with the second plurality of clutch plates 148 and may move axially relative thereto. The apply plate 168 includes a shoulder 174 which positions and receives a beveled or Belleville spring 176. The Belleville spring 176 provides a biasing force, driving the apply plate 168 toward the pluralities of clutch discs 146 and 148 and away from a circular armature 178. The circular armature 178 includes a plurality of discontinuous, curved, banana slots 180 and a plurality of male splines 182 about its periphery which are complementary to and engage the plurality of female splines 142 on the interior of the clutch end bell 140. Thus, the armature 178 rotates with the end bell 140 and the first plurality of clutch plates 146.

The armature 178 is disposed adjacent a U-shaped circular rotor 182. The rotor 182, which is preferably fabricated of soft iron, includes a pair of spaced apart pluralities of discontinuous, curved, banana slots 184 which cooperate with the banana slots 180 in the armature 178 to create a sinuous magnetic flux path which improves operation of the disc pack clutch assembly 120B and increases its torque throughput. The rotor 182 also includes an annulus 186 of magnetic flux directing material secured about its periphery by, for example, a shrink fit or an adhesive. The flux directing annulus 186 directs and focuses magnetic flux to also improve operation of the disc pack clutch assembly 120B and increase its torque throughput. The material of the flux directing annulus 186 is preferably powdered metal with a Teflon binder which may be like or similar to material designated Fluxtrol A manufactured by Fluxtrol Manufacturing, Inc. of Auburn Hills, Mich. (Teflon is a registered trademark of E. I. DuPont deNemours Co.)

The rotor 182 generally surrounds a stationary housing 188 which contains an electromagnetic coil 192. The stationary housing 188 and the electromagnetic coil 192 are secured to the bell housing 114B by a plurality of threaded studs and fasteners 194, one of which is illustrated in FIG. 3. Electrical energy is selectively provided to the electromagnetic coil 192 through a conductor 196, illustrated in FIG. 2. Coupled to the rotor 182 by any suitable means such as weldments, interengaging splines or an interference fit and disposed concentrically about the output shaft 130B is a first circular member 202. A low friction collar 204 made of, for example, nylon is interposed the first circular member 202 and the output shaft 130B and thus the first circular member 202 and the rotor 182 are free to rotate about both the output shaft 130B and the housing 188 of the electromagnetic coil 192. The low friction collar 204 reduces friction between the first circular member 202 and the output shaft 130B when the disc pack clutch assembly 120B is deactivated thereby reduced drag wear and heat generation.

The first circular member 202 includes a plurality of curved ramps or recesses 206 arranged in a circular pattern about the axis of the output shaft 130B. The ramps or recesses 206 represent oblique sections of a helical torus. Disposed within each of the recesses 206 is a load transferring ball 208 or similar load transferring member which rolls along the ramps defined by the oblique surfaces of the recesses 206. A second circular member 212 is disposed in opposed relationship with the first circular member 202 and includes a like plurality of complementarily sized and arranged recesses 214. The load transferring balls 208 are thus received and trapped within the pairs of opposing recesses 206 and 214, the ends of the recesses being curved and much steeper in slope than the interior regions of the recesses 206 and 214 such that the load transferring balls 208 are retained therein. A plurality of wave washers or Belleville springs 216 are disposed between the second circular member 212 and the collar 156 and bias the second circular member 212 toward the first circular member 202.

It will be appreciated that the recesses 206 and 214 and the load transferring balls 208 may be replaced with other analogous mechanical elements which cause axial displacement of the circular members 202 and 212 in response to relative rotation therebetween. For example, tapered rollers disposed in complementarily configured conical helices may be utilized.

An important design consideration of the recesses 206 and 214, the load transferring balls 208 and the springs 216 is that the geometry of their design and the overall clearances in the clutch assemblies 120A and 120B ensure that they are not self-engaging. The modulated clutch assemblies 120A and 120B must not self-engage but rather must be capable of modulating clamping of the clutch plates 146 and 148 and torque transfer in direct, proportional response to the electrical input to the electromagnetic coil 192. Additional details of this mechanism may be found in U.S. Pat. No. 5,492,194 which is hereby incorporated by reference.

The second circular member 212 includes a plurality of female splines or gear teeth 218 which are complementary to and engage the male splines or gear teeth 162 on the output shaft 130B. The axial position of the first circular member 202 is established by a thrust bearing assembly 222. Adjacent the thrust bearing assembly 222 is an anti-friction bearing such as a ball bearing assembly 224 which rotatably supports, and axially locates the output shaft 130B.

An output flange 226 is disposed upon the output shaft 130 and rotationally coupled thereto by an interengaging set of splines or gear teeth 228. The output flange 226 may form a portion of a universal joint or other connection to the rear axle 38. A flat washer 232 is received within the open end of the flange 226 and a nut 234 or similar fastener is threaded onto the output shaft 130B to tightly and securely retain the output flange 226 thereon. A suitable oil seal 236 disposed between the housing 114B and the output flange 226 provides an appropriate fluid retaining seal therebetween.

As noted above, the scoops or scavengers 108 provide cooling and lubricating fluid 110 to the hollow interior 104 of the tubular drive member 94 when it is rotating in a direction corresponding to forward vehicle motion. The output shaft 130B is partially hollow and defines an axial bore 242 which communicates with the hollow interior 104 of the tubular drive member 94 and also communicates with a plurality of radial passageways 244 which provide the cooling and lubricating fluid 110 to components of the disc pack clutch assembly 120B.

A brief description of the operation of one of the disc pack clutch assemblies 120B of the rear differential assembly 36 highlights the improvements and features thereof. When the electromagnetic coil 192 is not energized, the output shaft 130B freewheels relative to the tubular input member 94 which functions as the input drive member. As current flow to the electromagnetic coil 192 commences and is increased, drag is created which attempts to slow rotation of the rotor 182, causing relative rotation between the first and second circular members 202 and 212. As this occurs, the load transferring balls 208 ride up the recesses 206 and 214, separate the first and second circular members 202 and 212 and drive the second circular member 212 toward the apply plate 168. Translation of the apply plate 168 compresses the pluralities of clutch discs 146 and 148 and transfers drive torque from the tubular drive member 94 and clutch end bell 140 to the collar 156 and the output shaft 130B.

It should be noted that the compressive force generated by the first and second circular members 202 and 212 passes through the apply plate 168, the pluralities of clutch plates 146 and 148, the clutch end bell 140, through the annular collar 124 and into the output shaft 130B through the shoulder 132. Reaction force is thus carried axially along the length of the output shaft 130B, through the nut 234 and the output flange 226, through the ball bearing assembly 224 and the thrust bearing 222 and thence back to the first circular member 202. The flange or shoulder 132 and the inboard terminus of the output flange 226 thus act as fixed stops which confine the components of the disc pack clutch assembly 120B and direct the reaction force from its operation into the output shaft 130B. It will thus be appreciated that the reaction force generated by operation of the disc pack clutch assembly 120B is effectively fully contained within the output shaft 130B and does not pass through the housing 114B, the center housing 76 or other components. Such direct containment of the clutch operator reaction force reduces forces and flexure of the housings 76, 114A and 114B and improves the modulating control and service life of the rear differential assembly 36 and its components.

It should also be noted that while the above-described preferred embodiment of a clutch having an internal reaction force circuit utilizes an electromagnetic operator, a piston and cylinder arrangement utilizing either hydraulic fluid or a gas under pressure such as air are all readily adaptable to actuate the clutch pack and realize the features and benefits of the internal reaction force path or circuit of the present invention. Thus, such various clutch actuator configurations are deemed to be well within the scope of the present invention.

Finally, it should be understood that while the output shaft 130B has been described above as the reaction force containing member, the direction of torque flow through the multiple disc pack clutch assembly 120B may readily be reversed or the clutch assembly 120B may be slightly reconfigured such that the shaft 130B is the input shaft. In either case, the shaft 130B functions as the reaction force containing member.

The foregoing disclosure is the best mode devised by the inventors for practicing this invention. It is apparent, however, that apparatus incorporating modifications and variations will be obvious to one skilled in the art of drive line clutch components. Inasmuch as the foregoing disclosure is intended to enable one skilled in the pertinent art to practice the present invention, it should not be construed to be limited thereby but should be construed to include such aforementioned obvious variations and be limited only by the spirit and scope of the following claims.

We claim:

1. A twin clutch axle comprising, in combination, an input member, a gear set driven by said input member and having an output defining an axis of rotation, a pair of multiple disc clutch assemblies each driven by said output of said gear set and having an output member disposed for rotation about said axis of rotation including a pair of spaced-apart stops and adapted to drive a rear axle, said clutch assemblies each disposed on said output member between said spaced-apart stops and having a first plurality of clutch discs disposed for rotation with said output of said gear set, a second plurality of clutch discs interleaved with said first plurality of clutch discs and disposed for rotation with said output member and a clutch operator for compressing said first and said second pluralities of clutch discs, said clutch operator including a stationary electromagnetic coil, a band of magnetic flux directing material disposed adjacent said coil and a force generating cam assembly for converting rotary motion into axial force for adjustably compressing said pluralities of clutch discs.

2. The twin clutch axle of claim 1 further including a motor vehicle having a primary drive line disposed in a forward portion and a secondary drive line disposed in a rearward portion and wherein said twin clutch axle is disposed in said secondary drive line.

3. The twin clutch axle of claim 1 further including a microprocessor having a pair of outputs, each of said outputs driving a respective one of said stationary electromagnetic coils.

4. The twin clutch axle of claim 3 wherein said microprocessor includes four wheel speed inputs and further including four wheel speed sensors having outputs provided to said wheel speed inputs of said microprocessor.

5. The twin clutch axle of claim 1 wherein said clutch operator includes a rotor partially surrounding said electromagnetic coil and an armature disposed adjacent said rotor.

6. The twin clutch axle of claim 1 wherein said clutch operator further includes a ball ramp assembly having a pair of opposed circular members defining complementarily configured opposed ramped recesses and rolling members disposed in said recesses whereby relative rotation of said members translates said members axially.

7. The twin clutch axle of claim 1 wherein said input member rotates about a first axis and said axis of rotation is disposed perpendicularly to said first axis.

8. An adaptive torque delivery system for a primary front wheel drive vehicle comprising, in combination,
a primary drive line disposed forward in such vehicle and having a differential, a pair of axles and a pair of primary tire and wheel assemblies,
a secondary drive line disposed rearward in such vehicle and having a twin clutch differential, a pair of secondary axles and a pair of secondary tire and wheel assemblies,
said twin clutch differential including an input member, a gear set driven by said input member and driving an output member, a pair of clutches operably disposed between said output member and a respective one of said secondary axles, each of said clutches disposed upon a reaction force member having two spaced-apart stops and including a multiple disc clutch assembly and a clutch operator disposed between said two spaced-apart stops,
a wheel speed sensor having an output associated with each of said primary and said secondary tire and wheel assemblies, and
a microprocessor having a plurality of inputs for said speed sensor outputs and a pair of outputs driving a respective one of said clutch operators of said pair of clutches.

9. The adaptive torque delivery system of claim 8 wherein said clutch operators each include a stationary electromagnetic coil and an assembly for converting rotational motion into axial force for compressing said multiple disc clutch assembly.

10. The adaptive torque delivery system of claim 9 wherein said clutch operator includes a rotating member acted upon by magnetic flux from said electromagnetic coil and said assembly includes oblique camming surfaces.

11. The adaptive torque delivery system of claim 9 wherein said assembly includes a ball ramp operator having a pair of opposed circular members defining complementarily configured opposed ramped recesses and rolling members disposed in said recesses whereby relative rotation of said members translates said members axially.

12. The adaptive torque delivery system of claim 8 wherein said wheel speed sensors are Hall effect sensors.

13. The adaptive torque delivery system of claim 8 further including a prime mover and transmission driving said primary and said secondary drive lines.

14. A method of operating a dual clutch axle in a secondary drive line of a motor vehicle having primary front wheel drive comprising the steps of:
independently sensing a speed of four tire and wheel assemblies of such motor vehicle,
sensing a speed of one of primary and secondary prop shafts,
converting such sensed speeds into electrical signals,
providing such signals to individual inputs of a microprocessor,
providing a transaxle having a primary output driving a primary differential and primary tire and wheel assemblies and a secondary output,
providing a twin clutch rear axle having a bevel gear set driven by said secondary output and driving both clutches of said twin clutch rear axle,
providing independent electrical signals from said microprocessor to each of said clutches of said twin clutch rear axle to engage said clutches and deliver torque to a respective one of a pair of rear axles and secondary tire and wheel assemblies to control yaw in said motor vehicle.

15. The method of operating a dual clutch axle of claim 14 wherein said torque delivery to a rear axle is independently controlled.

16. The method of operating a dual clutch axle of claim 14 wherein said clutches are modulating electromagnetic clutches.

17. The method of operating a dual clutch axle of claim 14 wherein said sensing step is performed by Hall Effect sensors.

18. The method of operating a dual clutch axle of claim 14 wherein said microprocessor determines action necessary to correct for a skid or yaw condition of such vehicle.

19. The method of operating a dual clutch axle of claim 14 further including sensing the speed of a primary drive line.

20. The method of operating a dual clutch axle of claim 14 further including conditioning such sensed speed electrical signals in such microprocessor.

21. A clutch for use in a motor vehicle drive line component comprising, in combination,
an input
an output member having a pair of spaced-apart stops,
a modulating clutch assembly disposed on said output member between said pair of spaced-apart stops, said modulating clutch having a first plurality of clutch discs disposed for rotation with said input, a second plurality of clutch discs interleaved with said first plurality of clutch discs and disposed for rotation with said output member and a clutch operator for compressing said first and said second pluralities of clutch discs,
said clutch operator including a stationary electromagnetic coil, a rotor partially surrounding said electromagnetic coil, a band of magnetic flux directing material disposed about said rotor and an armature disposed adjacent said rotor, and
a ball ramp operator having a pair of opposed circular members defining complementarily configured opposed ramped recesses and rolling members disposed in said recesses whereby relative rotation of said members translate said members axially, whereby reaction force generated during clutch operation is contained in said output member.

22. The clutch of claim 21 wherein one of said pair of stops is a radial shoulder extending from said output member.

* * * * *